US009712617B2

United States Patent
Shani (10) Patent No.: US 9,712,617 B2
(45) Date of Patent: Jul. 18, 2017

(54) FLOW CONTROL IN REMOTE REPLICATION

(71) Applicant: Infinidat LTD., Herzliya (IL)

(72) Inventor: Ayelet Shani, Moshav herev le'et (IL)

(73) Assignee: INFINIDAT LTD., Herzliya (IL)

( * ) Notice: Subject to any disclaimer, the term of this patent is extended or adjusted under 35 U.S.C. 154(b) by 188 days.

(21) Appl. No.: 14/791,535

(22) Filed: Jul. 6, 2015

(65) Prior Publication Data

US 2017/0013057 A1   Jan. 12, 2017

(51) Int. Cl.
  *G06F 3/06*  (2006.01)
  *H04L 29/08*  (2006.01)
(52) U.S. Cl.
  CPC .......... *H04L 67/1095* (2013.01); *G06F 3/065* (2013.01); *G06F 3/067* (2013.01); *G06F 3/0619* (2013.01); *H04L 67/1097* (2013.01); *H04L 67/2842* (2013.01)
(58) Field of Classification Search
  CPC ..... H04L 67/1095; G06F 3/0619; G06F 3/065
  USPC ........ 709/223, 224, 226, 227, 244; 711/161, 711/162, 170
  See application file for complete search history.

(56) References Cited

U.S. PATENT DOCUMENTS

| 7,181,482 B2* | 2/2007 | Jain ................. G06F 17/30289 |
| 2011/0289290 A1* | 11/2011 | Akirav ................. G06F 11/1453 711/162 |
| 2014/0177440 A1* | 6/2014 | Boddu ................. H04L 12/1881 370/230.1 |

OTHER PUBLICATIONS

"Using Oracle Streams Advanced Queuing in Application Messaging Infrastructures"—Rajagopal et al, Oracle, Jul. 2007 http://www.dell.com/downloads/global/power/ps2q07-20070232-Rajagopal.pdf.*

* cited by examiner

*Primary Examiner* — Randy Scott
(74) *Attorney, Agent, or Firm* — Reches Patents (57) ABSTRACT

A method for controlling multiple replication processes that includes allocating, by a local storage system and for each replication process, local resources for performing local operations that comprise transmitting remote replication content to a remote storage system; the allocating is responsive to a state of transmission of the replication content and a maximal local storage system allocation threshold; allocating, by the remote storage system and for each replication process, remote resources for performing remote operations that comprise handling the replication content transmitted from the local storage system; the allocating is responsive to a load associated with the handling of the replication content, and a maximal remote storage system allocation threshold; and executing each replication process by the replication process local and remote storage systems resources.

18 Claims, 3 Drawing Sheets

FLOW CONTROL IN REMOTE REPLICATION

BACKGROUND

Remote replication in storage systems is used to replicate volumes from a local storage system to a remote storage system.

In asynchronous remote replication, batches of updates are periodically sent to the remote storage system. Preparing the batches of updates involves some data processing, for example, in the local storage system, the processing may include: determining the differences that occurred in a volume to be replicated since the previous cycle, and further involves accessing storage drives or cache memory for reading the data that needs to be transmitted to the remote storage system, queueing the data in a transmission queue of the communication protocol and then utilizing a communication line for transmitting replication messages containing the updates. In the remote storage system, some equivalent data processing is performed, such as: reading the replication messages from the receive queue of the communication protocol and writing the data of the updates to the mirrored volume.

Multiple replication processes can be handled in parallel, each replication process replicates data of a specific storage entity, e.g., a volume.

When implementing asynchronous replication, the replication processes take place at the background, concurrently with processes of handling I/O from hosts, which are performed in the foreground without being dependent on the execution of the replication processes. The replication processes are generally given a lower priority than the processes at the foreground so as not to affect the latency of ongoing I/O requests.

The local and remote storage systems may both manage background and foreground processes and each of the systems may experience different workload. One of the two systems, e.g., the local storage system, can process the batch of updates faster than the other system or faster than the communication line can handle. This unbalanced processing can cause bottlenecks, either at the communication line or at the remote storage system, and eventually the replication process will be halted until the bottlenecks are alleviated and the remote storage system responds. For example, if the local storage system transmits updates of a certain volume to the remote storage system faster than the remote storage system can handle, then the end-to-end replication process of the certain volume will be slowed down to comply with the pace of handling updates at the remote storage system. Thus the faster processing at the local storage system does not contribute to hastening the replication, as the bottleneck is at the remote storage system. In addition, the faster processing at the local storage system may waist resources that could have been used by other replication processes and may also cause unnecessary latency to foreground processes running at the local storage system and share the system resources with the replication processes.

SUMMARY

There are provided systems, methods and non-transitory computer readable media for decoding one or more component codes, as illustrated in the claims.

According to an embodiment of the invention there may be provided a method for controlling multiple replication processes, the method may include allocating, by a local storage system and for each replication process of the multiple replication processes, local resources for performing local operations related to the replication process, wherein the local operations comprise transmitting replication content to a remote storage system; wherein the allocating of the local resources is responsive to (a) a state of transmission of the replication content, and (b) a maximal local storage system allocation threshold; allocating, by the remote storage system and for each replication process of the multiple replication processes, remote resources for performing remote operations related to the replication process, wherein the remote operations comprise handling the replication content transmitted from the local storage system; wherein the allocating of the remote resources is responsive to a load associated with the handling of the replication content, and (b) a maximal remote storage system allocation threshold; executing, for each replication process of the multiple replication processes, the local operations in response to the allocation of the local resources; and executing, for each replication process of the multiple replication processes, the remote operations in response to the allocation of the remote resources.

The method may include avoiding sending, by the remote storage system to the local storage system, information about a progress of the remote operations.

The allocating of the remote resources may include allocating a remote queue per each replication process of the multiple replication processes and determining a dequeuing rate of replication content from the remote queue.

The method may include decreasing the dequeuing rate when a number of pending write requests related to the replication content is above a write request threshold, thereby causing the local storage system to decrease a rate of producing the replication content.

The method may include allocating of the local resources may include allocating a local queue per each replication process of the multiple replication processes and gradually increasing a rate of producing the replication content when a transmission of the replication content is not stopped and a dequeuing rate of the local queue is below a maximal dequeuing rate threshold.

The allocating of the local resources may include gradually decreasing a rate of producing of the replication content when the transmission of the replication content stopped.

The method may include allocating of the local resources may include allocating a local queue per each replication process of the multiple replication processes and gradually increasing a rate of producing the replication content when a transmission of the replication content is not deteriorative.

The allocating of the local resources may include gradually decreasing a rate of producing of the replication content when the transmission of the replication content is deteriorative.

The method may include allocating a remote queue for each replication process of the multiple replication processes and gradually increasing a dequeuing rate from the remote queue when a number of pending write requests related to the replication content is below a write request threshold.

The method may include allocating a remote queue for each replication process of the multiple replication processes and gradually increasing a dequeuing rate from the remote queue when a rate of data written per time unit is below a write rate threshold.

According to an embodiment of the invention there may be provided a group of at least one non-transitory computer readable medium that stores first instructions and second instructions; wherein the first instructions, once executed by a local storage system causes the local storage system to execute the steps of allocating, by a local storage system and for each replication process of the multiple replication processes, local resources for performing local operations related to the replication process, wherein the local operations comprise transmitting remote replication content to a remote storage system; wherein the allocating of the local resources is responsive to (a) a state of transmission of the replication content, and (b) a maximal local storage system allocation threshold; allocating, by the remote storage system and for each replication process of the multiple replication processes, remote resources for performing remote operations related to the replication process, wherein the remote operations comprise handling the replication content transmitted from the local storage system; wherein the allocating of the remote resources is responsive to a load associated with the handling of the replication content, and (b) a maximal remote storage system allocation threshold; executing, for each replication process of the multiple replication processes, the local operations in response to the allocation of the local resources; and executing, for each replication process of the multiple replication processes, the remote operations in response to the allocation of the remote resources.

The second instructions, once executed by the remote storage system causes the remote storage system to avoid sending to the local storage system information about a progress of the remote operations.

The second instructions, once executed by the remote storage system causes the remote storage system to allocate a remote queue per each replication process of the multiple replication processes and determining a dequeuing rate of replication content from the remote queue.

The first instructions, once executed by the local storage system causes the local storage system to allocate a local queue per each replication process of the multiple replication processes and gradually increasing a rate of producing the replication content when a transmission of the replication content is not stopped and a dequeuing rate of the local queue is below a maximal dequeuing rate threshold.

The first instructions, once executed by the local storage system causes the local storage system to gradually decrease a rate of producing of the replication content when the transmission of the replication content stopped.

The second instructions, once executed by the remote storage system causes the remote storage system to allocate a remote queue for each replication process of the multiple replication processes and gradually increasing a dequeuing rate from the remote queue when a number of pending write requests related to the replication content is below a write request threshold.

The group of at least one non-transitory computer readable medium may include a first non-transitory computer readable medium for storing the first instructions and a second non-transitory computer readable medium for storing the second instructions.

According to an embodiment of the invention there may be provided a system may include a remote storage system and a local storage system; wherein local storage system may include a local controller; wherein the local controller may be configured to allocate, for each replication process of the multiple replication processes, local resources for performing local operations related to the replication process, wherein the local operations comprise transmitting remote replication content to a remote storage system; wherein the allocating of the local resources is responsive to (a) a state of transmission of the replication content, and (b) a maximal local storage system allocation threshold; wherein remote storage system may include a remote controller; wherein the remote controller may be configured to allocate, for each replication process of the multiple replication processes, remote resources for performing remote operations related to the replication process, wherein the remote operations comprise handling the replication content transmitted from the local storage system; wherein the allocating of the remote resources is responsive to a load associated with the handling of the replication content, and (b) a maximal remote storage system allocation threshold; wherein the local storage system may be configured to execute, for each replication process of the multiple replication processes, the local operations in response to the allocation of the local resources; and wherein the remote storage system may be configured to execute, for each replication process of the multiple replication processes, the remote operations in response to the allocation of the remote resources.

The local resources comprise local storage system memory resources, local storage system communication resources and local storage system processing resources; and wherein the remote resources comprise remote storage system memory resources, remote storage system communication resources and remote storage system processing resources.

The remote storage system may be configured to avoid sending to the local storage system information about a progress of each remote operation.

The remote controller may be configured to allocate a remote queue for each replication process of the multiple replication processes and to determine a dequeuing rate of replication content from the remote queue.

The local controller may be configured to allocate a local queue for each replication process of the multiple replication processes and to gradually increase a rate of producing the replication content when a transmission of the replication content is not stopped and a dequeuing rate of the local queue is below a maximal dequeuing rate threshold.

The local controller may be configured to gradually decrease a rate of producing of the replication content when the transmission of the replication content stopped.

The remote controller may be configured to allocate a remote queue for each replication process of the multiple replication processes and to gradually increase a dequeuing rate from the remote queue when a number of pending write requests related to the replication content is below a write request threshold.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The local storage system and the remote storage system of the present invention synchronize the pace in which replication processes in the two systems handle replication related operations, aiming to execution at maximum possible pace, without violating the system resources available to each replication process in each of the storage systems and while eliminating bottlenecks at any point of the end-to-end route, by avoiding situations of accelerated pace on one system when the other system cannot keep up with the same pace. The algorithms take into account network bandwidth and maximum allowed resource utilization (e.g., processing time, memory/storage usage) available for the sake of replication. According to embodiments of the present invention, there is no need for communicating information related to workload status or performance (e.g., latency) from the remote storage system to the local storage system in order to control the flow of a replication process.

Figure 1:
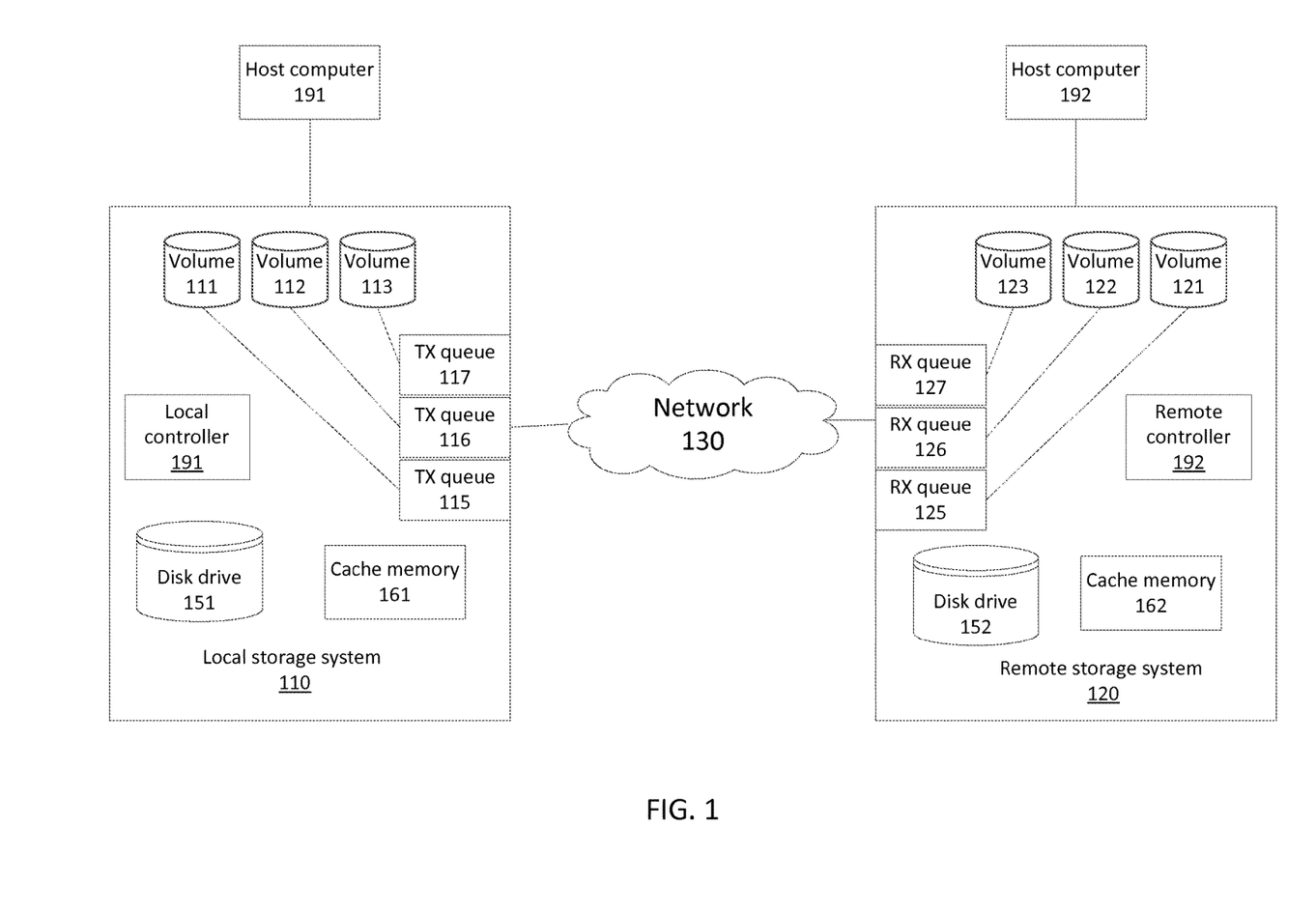
FIG. 1 illustrates a local storage site, a remote storage site and their environment according to an embodiment of the invention.

FIG. 1 illustrates a local storage system 110 and a remote storage system 120 according to an embodiment of the invention.

Local storage system 110 includes local controller 191 for controlling the replication processes and also includes local storage system memory resources such as drive disk 151 and cache memory 161, local storage system communication resources such as transmit (TX) queues 117, 116 and 115 as well as the bandwidth available to local storage system 110 by network 130, and local storage system processing resources.

Remote storage system 120 includes remote controller 192 for controlling the replication processes and also includes remote storage system memory resources such as drive disk 152 and cache memory 162, remote storage system communication resources such as reception (RX) queues 127, 126 and 125 as well as the bandwidth available to remote storage system 120 by network 130, and remote storage system processing resources.

Local storage system 110 and remote storage system 120 are involved in one or more replication processes, each replication process conducts the replication of one storage entity (e.g., a volume). For example, there are three replication processes for replicating source volumes 111, 112 and 113 that are being replicated to replicate volumes 121, 122 and 123 in remote storage system 120, where three replication processes handles the updates to replicated volumes 121, 122 and 123. The data of volumes 111, 112 and 113 can be stored in permanent storage devices, such as disk drive 151, as well as in cache memory 161. The data of volumes 121, 122 and 123 can be stored in permanent storage devices, such as disk drive 152, as well as in cache memory 162.

The two systems communicate replication messages through network 130 that couples the two systems. The replication messages may comply with TCP protocol.

Local storage system 110 performs operations for preparing the transmission of updates of the source volumes to remote storage system 120. These operations include, for example: calculating differences that occurred in the volumes to be replicated, reading the data related to these differences from disk drives, such as disk drive 151 or from cache memory 161 and prepare replication messages that include the data related to these differences.

Before being sent from local storage system 110, the replication messages are enqueued on communication transmit queues. Each replication process is assigned with one communication transmit queue. For example, transmit queue 115 is assigned to the replication process of source volume 111, transmit queue 116 is assigned to the replication process of source volume 112, and transmit queue 117 is assigned to the replication process of source volume 113.

In addition to handling the replication processes, local storage system 110 handles processes that are not related to replication, such as performing operations requested by hosts, such as host 191.

At the remote storage system 120, each replication process is assigned with one receive queue. For example, receive queue 125 is assigned to source volume 121, receive queue 126 is assigned to source volume 122, and receive queue 127 is assigned to source volume 123. Receive queue 125 receives messages that were transmitted through transmit queue 115, receive queue 126 receives messages that were transmitted through transmit queue 116, and receive queue 127 receives messages that were transmitted through transmit queue 117.

After dequeuing the replication messages from the communication receive queues, remote storage system 120 performs operations for updating the volumes with the data of the differences. The operations may include writing to disk drives, such as disk drive 152 and/or to cache memory 162.

In addition to handling the replication processes, remote storage system 120 handles processes that are not related to replication, such as performing operations requested by host 192.

The term local storage system refers to a system that provides primary access of hosts to certain volumes, and the term remote storage system refers to a system that provides the access of hosts to mirrored versions of the certain volumes in cases when the local storage system fails. It is noted that system 120 functions as a remote storage system and system 110 functions as a local storage system only with regard to source volumes 111-113 and their mirror version 121-123. With regard to other volumes (not shown) the functionality may be reversed. Other volumes in both system may not be remote-replicated at all, or may be remote-replicated to systems other than 110, 120. The workload in one of the storage systems, e.g., 110, may be higher than the workload of the other system, e.g., 120, at a certain time and may be lower at other times. Similarly, the performance (throughput, latency) in one of the storage systems, e.g., 110, may be higher than the performance of the other system, e.g., 120, at a certain time and may be lower at other times.

All the aforementioned replication related operations consume system resources (e.g., memory, network bandwidth) and impose workload (computing time and I/O access time) on both systems. The term 'resource load' will be used hereinafter to describe resource consumption and/or workload.

According to embodiments of the invention, the remote storage system controls the rate of dequeuing the received replication messages from communication receive queues according to the resource load that the received replication messages impose on the remote storage system. The resource load is generated by operations related to writing the data of differences to the replicated volumes.

The remote storage system can reduce the rate of dequeuing from a certain receive queue of a certain replication process if the amount of resource load caused by the certain replication process crosses a threshold of maximum resource load assigned to the replication process. When the remote storage system reduces the rate of dequeuing and the local storage system transmits at a higher rate, then the receive queue may fill up with replication messages faster than the dequeuing of the replication messages. When the length of the receive queue reaches its maximum predefined length, the TCP will close the receive window automatically, which in turn signals the TCP transmission at the local storage system to stop sending.

When the resource load of the replication processing at the remote storage system is alleviated, the dequeuing rate can be increased, which in turn lessens the length of the receive queue and eventually the TCP will re-open the window, elevating the network bandwidth usage.

After dequeuing replication messages from a receive queue, the data of the differences included in the replication messages may be sent to a replication write queue, that includes write requests corresponding to the replication process. In the following description, the length of the replication write queue is used for measuring the resource load caused by the replication process, but any other measurement can be used as well, for example: amount of writes per second triggered by the replication process, the amount of memory used by the replication process, etc.

The rate of dequeuing from the certain receive queue can be gradually increased as long as the amount of resource load caused by the certain replication process does not exceed the threshold of maximum resource load assigned to the replication process. If the amount of resource load caused by the certain replication process crosses the threshold, then the rate of dequeuing from the certain receive queue can be gradually decreased until the resource load caused by the certain replication process drops below the threshold of maximum resource load assigned to the replication process. Eventually the rate of dequeuing will achieve a steady state, until there is a change in the amount of participating replication processes and the balance is re-achieved by controlling the rate of dequeuing.

The local storage system controls the pace of preparing differences for a certain replication process and for enqueueing replication messages on the transmit queue of the certain replication process. The resource load in the local storage system is caused mainly by reading the data of the differences but also by the network bandwidth utilization for transmitting the data to the remote storage system. The local storage system can increase the pace of preparing differences, when the resource load resulted by the certain replication process is below the maximum allowed for that certain replication process. For example, the local storage system can measure the number of reads per time unit triggered by the replication process or alternatively, measure the amount of memory used for reading the data of the differences and for the queueing in the transmit queue. The local storage system may gradually increase the pace of preparing differences as long as the amount of memory used by the replication process is below a certain pre-assigned threshold and also as long as the bandwidth allocated to the replication process is not exceeded. If any of the thresholds is exceeded, then the local storage system may gradually decrease the pace of preparing differences. The controlling of the pace of preparing differences may be further based on whether or not the communication was suspended by the remote storage system. Optionally, the measured amount of used memory also includes memory consumed by the transmit queue, so there is no need to check separately whether the remote reception has stopped.

Figure 2:
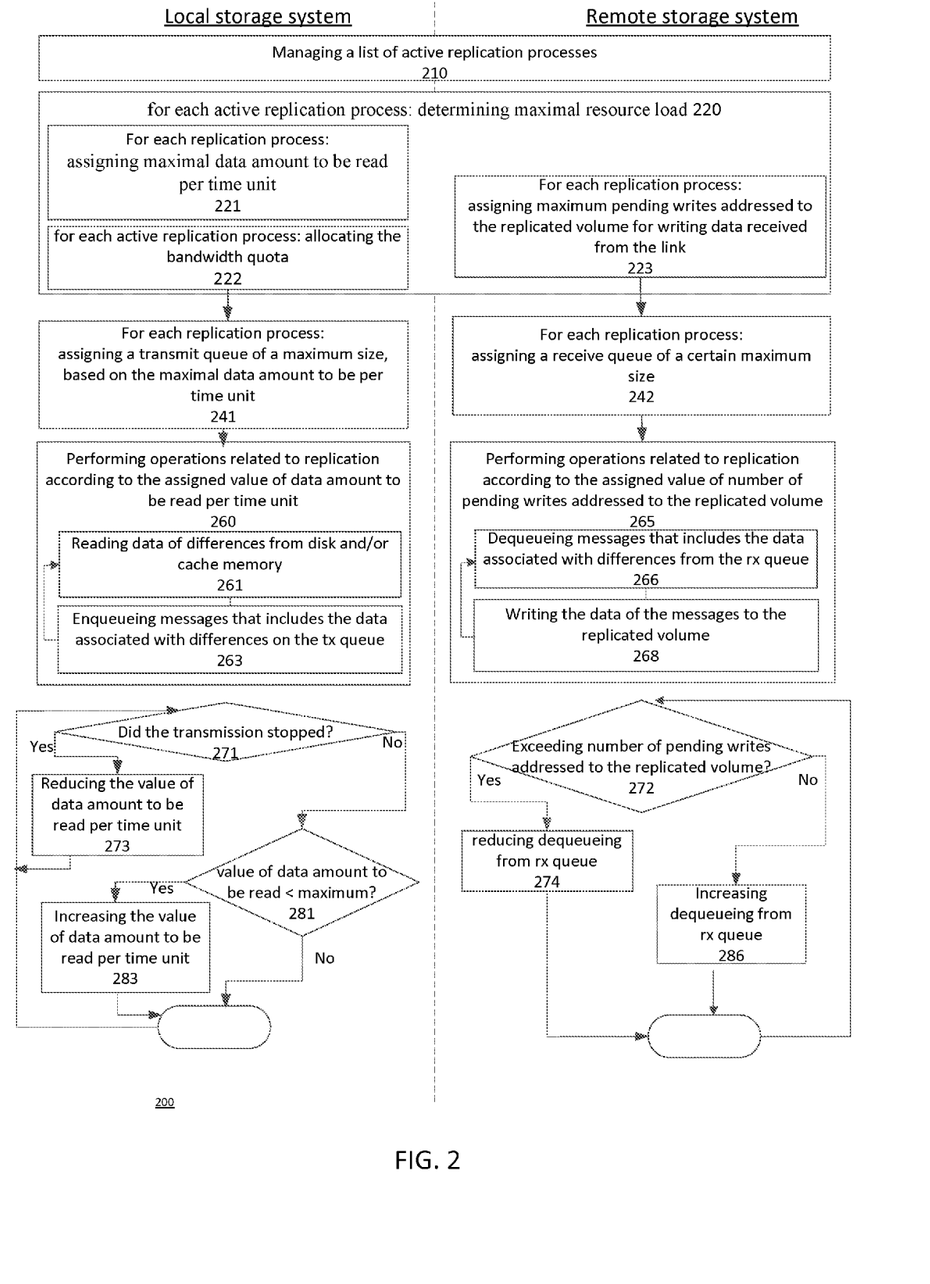
FIG. 2 illustrates a method according to an embodiment of the invention.

FIG. 2 illustrates method 200 for controlling the flow of remote replication processes according to an embodiment of the invention.

Step 210 is executed in both local and remote storage systems and includes managing a list of active replication processes. This step is performed in parallel to other steps and may include: adding new replication processes, deleting replication processes, halting (de-activating/ pausing) replication processes and activating paused replication processes. Step 210 also includes determining the number of active replication processes and this number influences the following steps. The following steps refer only to active replication processes, i.e., processes that currently communicate replication information between the local and remote storage systems.

The following steps are performed periodically, every time unit, for example every second, or upon a beginning of each replication cycle. The time unit may differ from a time period of a replication cycle.

Step 220 includes determining an upper limit of resource load for each replication process. It is assumed that a predetermined maximum amount of system resources are reserved for all the replication processes and that this maximum amount of resources is a fraction of the total resources of the storage systems, since other and more prioritized processes are executed in the storage system, such as I/O flow from the hosts. The resources maybe for example, computing resources, memory resources, total disk access time, etc. In the following examples, it is assumed that the resource being shared in the local storage system is a volatile memory required for facilitating reading and/or queueing the data to be sent to the remote storage system. If for example, the maximum amount of memory reserved for replication purposes is one Gigabyte and there are one hundred active replication processes, then each replication process is assigned with 10 megabytes of memory, if the memory resource is evenly shared. Any other criteria for sharing the memory resource can be implemented, such as sharing the memory resource according to required quality of service of the volumes being replicated or according to actual needs.

Accordingly, step 221, in the local storage system, includes for each replication process: assigning an upper limit of data amount to be read per time unit for purposes of replication. The assigned upper limit for data amount to be read is based at least on the maximum system resources (memory) allocated for all replication processes and on the number of active replication processes and may be further based on QoS assigned to the respective volumes. The upper limit for data amount to be read may be changed only when the number of active replication processes is changed, e.g., when adding or removing replication processes.

Optionally or alternatively, the memory resource quota can be translated into maximum data reads (from disks and/or from cache memory) that can exploit this quota within a time unit and step 221 may include assigning an upper limit of number of data reads.

In addition to the upper limit for data amount to be read per time unit, steps 273 and 283, described later on, sets a value for the current amount of data to be read, i.e., the amount to be used in the current/next-coming time unit. This value should not exceed the upper limit of data amount to be read per time unit. In the first time unit (the beginning of the method), the current amount of data to be read can be set as equal to or smaller than the upper limit.

In addition to memory consumption, the network bandwidth can also be a bottleneck in the local storage system. Therefore, step 220 in the local storage system further includes step 222 for allocating the bandwidth quota for each active replication process. Each replication process is assigned with a network bandwidth limit, which is a fraction of the total bandwidth of the network link that connects the two systems. The total bandwidth of the network is divided among all active replication processes. For example, the division can be even, so that if the network link has total bandwidth of ten gigabytes/seconds and there are one hundred active replication processes, then each replication process can use up to 100 megabytes/seconds. Alternatively, the allocation of the network bandwidth quota can be responsive to a quality of service associated with the volume being replicated.

In the following examples, the measured resource load in the remote storage system is the number of pending writes towards the replicated volume, but other measurements can be implemented, for example, the number of writes per time unit, the amount of memory consumed by pending writes, etc.

Step 223 at the remote storage system may include, for each replication process, assigning upper limit for pending writes addressed to the replicated volume for writing data received from the link. The restricting of writes is for avoiding vast consumption of computing resources by a single replication process. Alternatively, this step can specify the upper limit of amount of data to be written per time unit.

Step 220, including steps 221-223, is performed each time there is a change in the list of active replication processes, e.g., a new replication process is added or removed.

Step 241 includes, for each replication process at the local storage system, assigning a transmit queue of a maximum length, based on the upper limit of the data amount to be read.

Step 242 includes, for each replication process at the remote storage system, assigning a receive queue of a maximum length.

Steps 241 and 242 may include, for example, assigning a TCP socket for each replication process and defining the buffer size for the socket.

Steps 260 and 265 include replication activities that take place at the local and remote storage system respectively, for each replication process. Step 260 for performing operations related to a replication process, according to the assigned value of current data amount to be read, includes step 261 for reading data of differences from disk and/or cache memory associated with the source volume and step 263 for enqueueing messages that include the data associated with differences on the transmit queue.

The following steps 271, 273, 281 and 283 are executed concurrently with step 260. These steps can be performed constantly or periodically at an end of each time unit.

Step 271 at the local storage system includes checking whether the transmission stopped. The transmission can be stopped because the allocated bandwidth for transmission has been exceeded or because the transmission queue has reached a threshold. The transmit queue can reach the threshold if the reception has been suspended on the remote storage system, or other problems in the line (e.g., noise that causes retransmission. The checking of whether the transmission stopped may include checking whether the TCP communication stopped due to closed window at the remote storage system and/or checking whether the transmit queue length has been exceeded the threshold and/or checking that the amount of used bandwidth has exceeded the quota.

If the answer is YES, then step 271 is followed by step 273 of reducing the value of the current data amount to be read (in the next time unit). The reducing can include gradual reducing by a certain quantity and if in the next time unit, the transmission is still stopped, then another quantity will be reduced from the value of the current data amount to be read, until the transmission resumes. The gradual reduction can prevent fluctuation in the state of the transmission.

If the answer is NO, then step 271 is followed by step 281 of checking whether the value of the current data amount to be read is smaller than the upper limit (set on step 241).

If the answer is YES, step 281 is followed by step 283 of increasing the value of the current data amount to be read (in the next time unit). The increasing can include gradual increment by adding a certain quantity to the value of the current data amount to be read, and if in the next time unit, the transmission is still not stopped, then another quantity will be added to the value of the current data amount to be read, until the upper limit of data to be read is reached. The gradual increment can prevent fluctuation in the state of the transmission.

Referring back to the remote storage system, step 242 is followed by step 265 for performing operations related to replication. Step 265 includes step 266 of dequeuing replication messages from the receive queue and step 268 of writing the data of the messages to the replicated volume.

Step 268 may include prior to writing, queueing the data to be written to the replicated volume on the replication write queue.

Step 272 includes determining whether the upper limit of pending writes addressed to the replicated volume has been exceeded. The determining can include checking whether the length of the replication write queue has exceeded a threshold.

If the answer is YES, then step 272 is followed by step 274 of reducing the rate of dequeuing replication messages from the receive queue. The reducing can be gradual so as to avoid suspension of the communication. In the next time unit, if the number of pending writes is still high, another gradual reduction will take place until the length of the replication write queue is alleviated (e.g., dropped below a second threshold).

If the answer is NO (upper limit of pending writes addressed to the replicated volume has not been exceeded), then step 272 is followed by 286 of increasing the rate of dequeuing from the receive queue. The increasing can be gradual so as to avoid fluctuation in the state of the pending writes.

Optionally, the decision to increase the rate of dequeuing can be based on whether the communication was suspended. For example, if the number of pending writes is still too high but also the communication was suspended, then the dequeuing may still be increased or at least not reduced. This decision can take into account the total amount of resource load of all the replication processes and allow overload of resources of a specific replication process if the other replication processes are less active.

Figure 3:
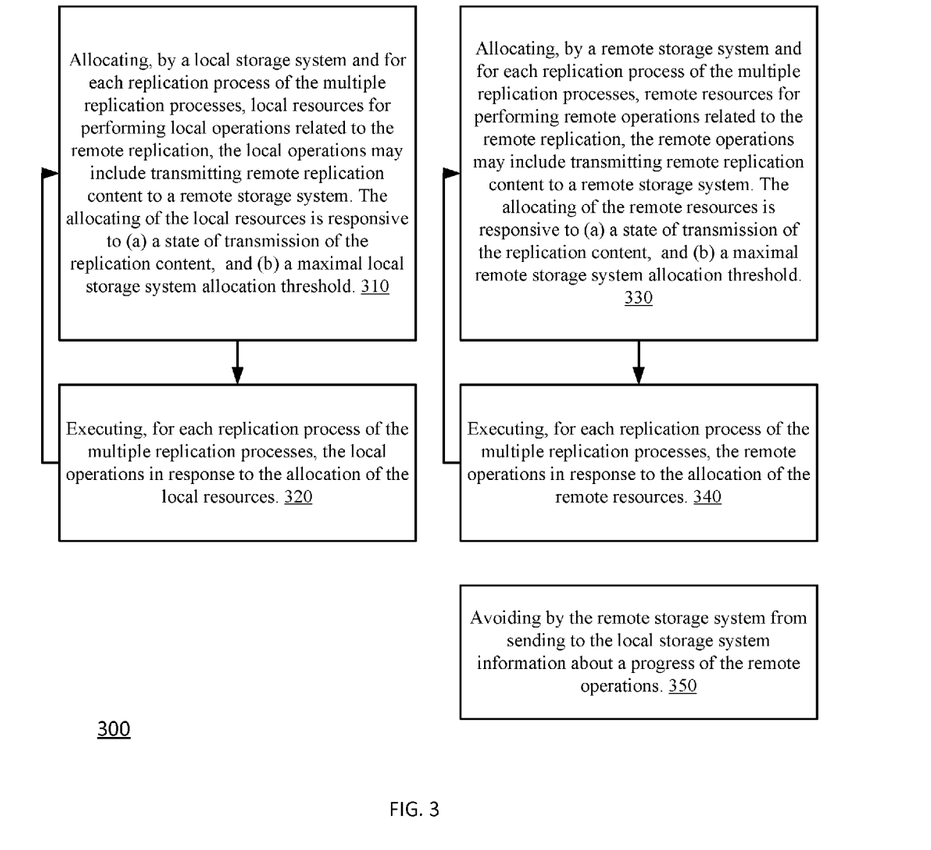
FIG. 3 illustrates a method according to an embodiment of the invention.

FIG. 3 illustrates method 300 for controlling multiple replication processes according to an embodiment of the invention.

Method 300 includes two sequences of steps.

The first sequence of steps starts by step 310 of allocating, by a local storage system and for each replication process of the multiple replication processes, local resources for performing local operations that are related to remote replication. The local operations may include transmitting replication content to a remote storage system. The local operations may also include producing the replication content before being transmitted. The producing may include: calculating differences, reading the data of the differences, queueing the replication content for transmission, and the like. The local resources may include memory resources required for temporary storing data of differences or to queue the replication content for transmission, transmission resources, computing resources for producing the replication content, and the like.

The replication content may include differences that occurred in a volume to be replicated since the previous cycle, may include replication messages, and the like.

The allocating of the local resources is responsive to (a) a state of transmission of the replication content, and (b) a maximal local storage system allocation threshold.

The maximal local storage system allocation threshold provides an upper limit for the local storage resources that can be allocated for executing the replication process. Non-limiting examples of such thresholds are illustrated in steps 221, 222 and 241 of FIG. 2.

Step 310 is performed periodically (i.e., in multiple iterations) so as to adjust to the dynamic nature of the state of transmission, and to changes that occasionally occur in the number of the multiple replication processes, which is a dynamic number that can be changed upon adding and deleting replication processes, and therefore influences the value of maximal local storage system allocation threshold per replication process.

The state of transmission may be indicative of a normal transmission or of a deteriorated transmission. A normal transmission can be defined when the replication content is transmitted in a rate that copes with the rate of accumulation of replication content for transmission (i.e., the transmission rate is faster than or equal to the accumulation rate). A deteriorated transmission is experienced when the transmission was suspended or slowed down, either because of ceasing or slowing down the reception at the remote storage system or due to exceeding the allocated bandwidth for transmitting replication content, leading to withholding of transmission. The state of transmission may be determined according to statuses received from a communication interface (e.g., TCP socket) or according to elevated accumulation of non-transmitted messages at the transmit queue of the replication process.

Non-limiting examples of step 310 are illustrated in steps 271, 273, 281 and 283 of FIG. 2.

Method 300 may include step 310 of allocating a local queue for each replication process of the multiple replication processes. The local queue is used for storing replication content and facilitating a transmission of replication content. Step 310 may include increasing a rate of producing the replication content when the state of transmission of the replication content is not deteriorative. It is noted that the allocation of a local queue per replication process does not change, at least while the replication process is active while the change in the rate of the producing of the replication content may change during the execution of the replication process.

The allocating of step 310 may include a gradual increasing of the allocation of resources and in response, a gradual increasing of the rate of producing the replication content. The term gradually increasing means that in each iteration of step 310 the producing of the replication content is increased by an amount that is smaller than the maximum possible amount to increase the rate of producing, as reflected by the maximal local storage system allocation threshold. Or in other words, the allocation of the replication process local resources, in a certain iteration, is increased to a value that is smaller than the maximal local storage system allocation threshold. For example, if the maximal local storage system allocation threshold dictates a maximum quota of memory usage, which can be translated into a maximum reads per time unit, then the gradual increasing of producing the replication content will include increasing the number of reads per time unit by a fraction (e.g., $\frac{1}{10}$) of the maximum reads per time unit, in each iteration of step 310, until reaching the maximum, or until the balance is lost.

Step 310 may include gradually decreasing a rate of producing of the replication content when the state of transmission of the replication content is not deteriorative. The term gradually decreasing means that in each iteration of step 310 the producing of the replication content is decreased by an amount that is smaller than an amount the will cause a zero production. Gradually decreasing the producing of the replication content may be in response to gradually decreasing the allocating, for example, reducing the value of current number of reads per time unit by a fraction of this value, until reaching zero or until balance is achieved.

Step 310 is followed by step 320 of executing, for each replication process of the multiple replication processes, the local operations in response to the allocation of the replication process local resources.

Step 320 may be followed by step 310. The recurrence frequency of step 310 may differ from the recurrence frequency of step 320.

Non-limiting examples of step 320 are illustrated in steps 260, 261 and 262 of FIG. 2.

The second sequence of steps starts by step 330 of allocating, by the remote storage system and for each replication process of the multiple replication processes, remote resources for performing remote operations related to the remote replications, the remote operations may include handling the replication content transmitted from the local storage system.

The allocating of the remote resources is responsive to a load associated with the handling of the replication content, and (b) a maximal remote storage system allocation threshold. The load associated with the handling of the replication content, may be the load experienced as result of writing data included in the replication content to storage devices.

The maximal remote storage system allocation threshold provides an upper limit for the remote storage resources that can be allocated for executing the replication process. Non-limiting examples of such thresholds are illustrated in steps 223 and 242 of FIG. 2.

Non-limiting examples of step 330 are illustrated in steps 272, 274 and 286 of FIG. 2.

Step 330 may include allocating a remote queue for each replication process of the multiple replication processes. The remote queue may store replication content received from the local storage system over a network. Step 330 may also include gradually increasing a dequeuing rate from the remote queue when a load associated with the remote operations is below the allowable (maximal) load threshold. For example—when a number of pending write requests related to the replication content is below a write request threshold.

It is noted that the allocation of a remote queue per replication process does not change, at least while the replication process is active while the change in the dequeuing rate may change during the execution of the replication process.

Step 330 may include decreasing a dequeuing rate from the remote queue when a number of pending write requests related to the replication content is above a write request threshold. The decreasing may be a gradual decreasing, in response to a gradual decrease in an allocation of the replication process remote resources. The decreasing of the dequeuing rate may cause the local storage system to decrease the rate of producing the replication content, since the decreasing of the dequeuing rate can cause the TCP to close the window, and in response the local storage system will sense a deteriorated transmission. The decreasing may results in a virtual synchronization between the remote system and the local system.

Step 330 is followed by step 340 of executing, for each replication process of the multiple replication processes, the remote operations in response to the allocation of the replication process remote resources.

Non-limiting examples of step 340 are illustrated in steps 265, 266 and 268 of FIG. 2.

Step 340 may be followed by step 330.

Method 300 may include step 350 of avoiding by the remote storage system from sending to the local storage system information about a progress of each remote operations, which includes performance of the progress, such as latency.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for controlling multiple replication processes, the method comprises:
    allocating, by a local storage system and for each replication process of the multiple replication processes, local resources for performing local operations related to the replication process, wherein the local operations comprise transmitting replication content to a remote storage system;
    wherein the allocating of the local resources is responsive to (a) a state of transmission of the replication content, and (b) a maximal local storage system allocation threshold;
    allocating, by the remote storage system and for each replication process of the multiple replication processes, remote resources for performing remote operations related to the replication process, wherein the remote operations comprise handling the replication content transmitted from the local storage system;
    wherein the allocating of the remote resources is responsive to a load associated with the handling of the replication content, and (b) a maximal remote storage system allocation threshold;
    wherein the allocating of the remote resources comprises allocating a remote queue per each replication process of the multiple replication processes and determining a dequeuing rate of the replication content from the remote queue;
    executing, for each replication process of the multiple replication processes, the local operations in response to the allocation of the local resources; and
    executing, for each replication process of the multiple replication processes, the remote operations in response to the allocation of the remote resources.

2. The method according to claim 1 comprising decreasing the dequeuing rate when a number of pending write requests related to the replication content is above a write request threshold, thereby causing the local storage system to decrease a rate of producing the replication content.

3. The method according to claim 1 comprising allocating of the local resources comprises allocating a local queue per each replication process of the multiple replication processes and gradually increasing a rate of producing the replication content when a transmission of the replication content is not stopped and a dequeuing rate of the local queue is below a maximal dequeuing rate threshold.

4. The method according to claim 1 wherein the allocating of the local resources comprises gradually decreasing a rate of producing of the replication content when the transmission of the replication content stopped.

5. The method according to claim 1 comprising allocating of the local resources comprises allocating a local queue per each replication process of the multiple replication processes and gradually increasing a rate of producing the replication content when a transmission of the replication content is not deteriorative.

6. The method according to claim 1 wherein the allocating of the local resources comprises gradually decreasing a rate of producing of the replication content when the transmission of the replication content is deteriorative.

7. The method according to claim 1 comprising gradually increasing the dequeuing rate from the remote queue when a number of pending write requests related to the replication content is below a write request threshold.

8. The method according to claim 1 comprising gradually increasing the dequeuing rate from the remote queue when a rate of data written per time unit is below a write rate threshold.

9. A group of at least one non-transitory computer readable medium that stores first instructions and second instructions;
 wherein the first instructions, once executed by a local storage system causes the local storage system to execute the steps of:
 allocating, by a local storage system and for each replication process of the multiple replication processes, local resources for performing local operations related to the replication process, wherein the local operations comprise transmitting remote replication content to a remote storage system;
 wherein the allocating of the local resources is responsive to (a) a state of transmission of the replication content, and (b) a maximal local storage system allocation threshold; and
 executing, for each replication process of the multiple replication processes, the local operations in response to the allocation of the local resources;
 wherein the second instructions, once executed by a remote storage system causes the remote storage system to execute the steps of:
 allocating, by the remote storage system and for each replication process of the multiple replication processes, remote resources for performing remote operations related to the replication process, wherein the remote operations comprise handling the replication content transmitted from the local storage system;
 wherein the allocating of the remote resources is responsive to a load associated with the handling of the replication content, and (b) a maximal remote storage system allocation threshold;
 wherein the allocating of the remote resources comprises allocating a remote queue per each replication process of the multiple replication processes and determining a dequeuing rate of the replication content from the remote queue;
 and
 executing, for each replication process of the multiple replication processes, the remote operations in response to the allocation of the remote resources.

10. The group of at least one non-transitory computer readable medium according to claim 9 wherein the first instructions, once executed by the local storage system causes the local storage system to allocate a local queue per each replication process of the multiple replication processes and gradually increasing a rate of producing the replication content when a transmission of the replication content is not stopped and a dequeuing rate of the local queue is below a maximal dequeuing rate threshold.

11. The group of at least one non-transitory computer readable medium according to claim 9 wherein the first instructions, once executed by the local storage system causes the local storage system to gradually decrease a rate of producing of the replication content when the transmission of the replication content stopped.

12. The group of at least one non-transitory computer readable medium according to claim 9 wherein the second instructions, once executed by the remote storage system causes the remote storage system to gradually increase a dequeuing rate from the remote queue when a number of pending write requests related to the replication content is below a write request threshold.

13. The group of at least one non-transitory computer readable medium according to claim 9 comprising a first non-transitory computer readable medium for storing the first instructions and a second non-transitory computer readable medium for storing the second instructions.

14. A system comprising a remote storage system and a local storage system;
 wherein local storage system comprises a hardware local controller;
 wherein the hardware local controller is configured to allocate, for each replication process of the multiple replication processes, local resources for performing local operations related to the replication process, wherein the local operations comprise transmitting remote replication content to a remote storage system;
 wherein the allocating of the local resources is responsive to (a) a state of transmission of the replication content, and (b) a maximal local storage system allocation threshold;
 wherein remote storage system comprises a hardware remote controller;
 wherein the hardware remote controller is configured to allocate, for each replication process of the multiple replication processes, remote resources for performing remote operations related to the replication process, wherein the remote operations comprise handling the replication content transmitted from the local storage system;
 wherein the allocating of the remote resources is responsive to a load associated with the handling of the replication content, and (b) a maximal remote storage system allocation threshold;
 wherein the hardware remote controller is configured to allocate a remote queue for each replication process of the multiple replication processes and to determine a dequeuing rate of the replication content from the remote queue:
 wherein the local storage system is configured to execute, for each replication process of the multiple replication processes, the local operations in response to the allocation of the local resources; and
 wherein the remote storage system is configured to execute, for each replication process of the multiple replication processes, the remote operations in response to the allocation of the remote resources.

15. The system according to claim 14 wherein the local resources comprise local storage system memory resources, local storage system communication resources and local storage system processing resources; and wherein the remote resources comprise remote storage system memory resources, remote storage system communication resources and remote storage system processing resources.

16. The system according to claim 14 wherein the local controller is configured to allocate a local queue for each replication process of the multiple replication processes and to gradually increase a rate of producing the replication content when a transmission of the replication content is not stopped and a dequeuing rate of the local queue is below a maximal dequeuing rate threshold.

17. The system according to claim 14 wherein the local controller is configured to gradually decrease a rate of producing of the replication content when the transmission of the replication content stopped.

18. The system according to claim 14 wherein the remote controller is configured to gradually increase a dequeuing rate from the remote queue when a number of pending write requests related to the replication content is below a write request threshold.

* * * * *